United States Patent

Geissler et al.

[11] Patent Number: 6,162,753
[45] Date of Patent: Dec. 19, 2000

[54] PROCESS FOR RECOVERING COBALT CARBONYL CATALYSTS USED TO PRODUCED N-ACYL-ALPHA-AMINO ACID DERIVATIVES BY AMIDOCARBONYLATION

[75] Inventors: Holger Geissler, Mainz; Peter Gross, Kelsterbach; Sandra Bogdanovic, Frankfurt, all of Germany

[73] Assignee: Aventis Research & Technologies GmbH & Co KG, Germany

[21] Appl. No.: 09/319,303

[22] PCT Filed: Dec. 1, 1997

[86] PCT No.: PCT/EP97/06707

§ 371 Date: Jul. 28, 1999

§ 102(e) Date: Jul. 28, 1999

[87] PCT Pub. No.: WO98/24547

PCT Pub. Date: Jun. 11, 1998

[30] Foreign Application Priority Data

Dec. 5, 1996 [DE] Germany ............... 196 50 501

[51] Int. Cl.[7] ............... B01J 20/34; B01J 38/64; B01J 38/68
[52] U.S. Cl. ............... 502/24; 502/25; 502/33; 502/34; 502/53
[58] Field of Search ............... 502/24, 25, 33, 502/34, 53

[56] References Cited

U.S. PATENT DOCUMENTS

| | | | |
|---|---|---|---|
| 4,350,668 | 9/1982 | Isogai et al. | 423/139 |
| 4,497,964 | 2/1985 | Ojima et al. | 562/406 |
| 4,699,999 | 10/1987 | El-Chahawi et al. | 562/450 |
| 5,026,900 | 6/1991 | Coste et al. | 560/204 |
| 5,235,112 | 8/1993 | Nadler et al. | 568/451 |
| 5,354,908 | 10/1994 | Nadler | 568/451 |
| 5,650,537 | 7/1997 | Beller et al. | 562/519 |
| 5,756,413 | 5/1998 | Bogdanovic et al. | 502/24 |

FOREIGN PATENT DOCUMENTS

| | | |
|---|---|---|
| 0343042 | 11/1989 | European Pat. Off. |
| 0779102 | 6/1997 | European Pat. Off. |

*Primary Examiner*—Steven P. Griffin
*Assistant Examiner*—Christina Ildebrando
*Attorney, Agent, or Firm*—Connolly Bove Lodge & Hutz LLP

[57] ABSTRACT

The present invention relates to a process for recovering cobalt carbonyl catalysts used in the preparation of N-acyl-alpha-amino acid derivatives by amidocarbonylation comprising the process steps:

adding aqueous hydrogen peroxide solution to the reaction solution present after the preparation of the N-acyl-α-amino acid derivative, then separating the aqueous phase containing water-soluble cobalt(II) salt from the nonaqueous product-containing phase, subsequently adding an alkali metal salt of the N-acyl-alpha-amino acid derivative to the aqueous phase from the previous process step, then separating off the precipitated cobalt salt of the N-acyl-alpha-amino acid derivative, and finally converting the resulting cobalt salt of the N-acyl-alpha-amino acid derivative into the cobalt carbonyl catalyst in the presence of a mixture of carbon monoxide and hydrogen.

16 Claims, No Drawings

PROCESS FOR RECOVERING COBALT CARBONYL CATALYSTS USED TO PRODUCED N-ACYL-ALPHA-AMINO ACID DERIVATIVES BY AMIDOCARBONYLATION

BACKGROUND OF THE INVENTION

Amidocarbonylation is, for the purposes of the present invention, the carbonylation of carboxamides in the presence of aldehydes and carbon monoxide or synthesis gas to give N-acyl-alpha-amino acid derivatives. This reaction is carried out in the presence of cobalt carbonyl compounds as homogeneous catalysts. The use of fatty acid amides as amide components and formaldehyde as aldehyde components makes it possible to employ this process to access the class of N-acylsarcosines which are used industrially as surfactants, soaps and emulsifiers.

DESCRIPTION OF THE RELATED ART

A significant part of such a preparative process is the development of a catalyst circuit, i.e. a process for separating the catalyst used which is dissolved in the reaction medium from the product prepared, its reprocessing and return to the preparative process.

For cost reasons and to avoid environmental pollution by cobalt compounds, a recovery process which is as complete as possible and at the same time simple and inexpensive is required for the cobalt carbonyl catalyst used.

Processes for recovering cobalt catalysts have already been described for various reactions.

The Japanese first publications 54-112816 and 58-198441 disclose processes for preparing dialkyl malonates by esterification of alkylmono-haloacetic acid with a lower aliphatic alcohol and carbon monoxide in the presence of a cobalt carbonyl catalyst and a basic compound. Subsequent to this esterification, the catalyst is decomposed into a divalent water-soluble cobalt salt by addition of an aqueous solution of an inorganic acid, e.g. sulfuric acid, or by addition of sulfuric acid and oxygen. The aqueous phase thus obtained is separated from the organic phase and the water-soluble cobalt salt is precipitated from it as water-insoluble cobalt hydroxide by addition of alkali metal hydroxide, e.g. sodium hydroxide. After washing, the cobalt hydroxide is finally converted into the corresponding cobalt carbonyl compound by treatment with carbon monoxide or carbon monoxide/hydrogen in the presence of an organic solvent, e.g. an aromatic hydrocarbon or an alcohol suitable for the esterification. The cobalt carbonyl catalyst obtained in this way is reused for the esterification.

The Japanese first publication 57-183749 describes a process for preparing α-amino-β-hydroxybutanoic acid in which, in a carbonylation step which takes place first, epichlorohydrin, carbon monoxide, a basic compound and an alcohol are reacted to give α-amino-β-hydroxybutanoic acid. In the next process step, the cobalt carbonyl catalyst is decomposed by addition of mineral acid, e.g. sulfuric acid, and oxygen to the reaction solution obtained in the previous process step to form a divalent water-soluble cobalt salt. The alcohol present in the reaction solution is then removed and water is subsequently added to form a two-phase system which is separated into an aqueous phase containing the water-soluble cobalt salt and an organic phase containing α-amino-β-hydroxybutanoic acid. The recovery of the cobalt carbonyl catalyst is carried out by addition of alkali metal hydroxide to the aqueous phase. The cobalt hydroxide precipitate formed is filtered off, washed and subsequently dewatered. Subsequent reaction of the cobalt hydroxide with carbon monoxide and hydrogen gives the cobalt carbonyl catalyst back again.

EP-A-0 343 042 relates to a process for preparing dialkyl malonates by carbonylation of alkyl chloroacetates in the presence of a cobalt carbonyl catalyst. The recovery of the cobalt carbonyl catalyst used is carried out in a plurality of process steps, with a water-soluble cobalt salt first being produced by addition of acid. In the next process step, this cobalt salt is converted into the salt of a fatty acid, e.g. oleic acid, palmitic acid or stearic acid. The desired cobalt carbonyl catalyst is obtained from this fatty acid salt by reaction with carbon monoxide and hydrogen.

A process for recovering cobalt carbonyl catalysts used in the preparation of N-acyl-alpha-amino acid derivatives by amidocarbonylation is described in the German Patent Application No. 195 45 641.9 which is prior art according to §3 II of the German Patent Law. In this process, the catalyst present in the reaction solution is converted into a water-soluble cobalt(II) salt by addition of $H_2O_2$ and possibly an acid, e.g. sulfuric acid. After phase separation and decomposition of excess $H_2O_2$, the aqueous phase containing the cobalt salt is brought to a pH of 12 by means of an alkali metal hydroxide in order to precipitate the cobalt as a cobalt hydroxide precipitate. The cobalt precipitate obtained in this way has to be carefully washed and dried in order to remove entrained salt residues. The pure cobalt hydroxide is subsequently processed with N-acyl-alpha-amino acid derivative to form a melt from which the cobalt carbonyl catalyst is obtained by reaction with carbon monoxide and hydrogen at elevated temperature and pressure.

However, this process has the disadvantage that it is necessary to work at high pH values, which requires the use of particularly suitable apparatuses. In addition, a considerable amount of sulfate salt (up to 10% by weight) is entrained in the precipitation of cobalt as hydroxide and this has to be removed in elaborate washing processes. A further disadvantage is that the reaction of cobalt hydroxide with the N-acyl-alpha-amino acid derivative to form a melt can result in the formation of cobalt hydroxide lumps which react further only slowly.

BRIEF SUMMARY OF THE INVENTION

It is an object of the present invention to provide a process for recovering cobalt carbonyl catalysts used in the preparation of N-acyl-alpha-amino acid derivatives, in particular N-acylsarcosines, by amidocarbonylation, which process enables the abovementioned disadvantages to be overcome.

In principle, the following technical difficulties have to be taken into account in such a process in the case of N-acyl-alpha-amino acid derivatives.

The reaction products of the amidocarbonylation, in particular the abovementioned N-acylsarcosines, are not volatile and can therefore not be removed from the reaction solution by distillation. Distillative recovery of the cobalt carbonyl catalysts which are volatile in pure form is likewise not possible since they are destroyed on heating the reaction solution, i.e. in the presence of N-acyl-α-amino acid derivatives. Likewise, it has to be noted that the cobalt carbonyl catalysts used for the amidocarbonylation are only partly present as active cobalt carbonyl catalysts after the reaction and the method of recovery therefore has to take into account a number of different cobalt carbonyl compounds.

Moreover, the separation of the cobalt catalysts from the reaction solution by phase separation into an aqueous, cobalt-containing phase and an organic, product-containing phase is made more difficult by the formation of complexes of the cobalt compounds and the N-acyl-alpha-amino acid derivatives obtained.

In addition, the cobalt carbonyl catalysts cannot, unlike the case of hydroformylation, be prepared from Co(II) salts, e.g. cobalt acetate, cobalt oxide and cobalt hydroxide, owing to the mild reaction conditions during the carbonylation stage of the amidocarbonylation, but have to be prepared in a prior process step in order to be able to be used in the subsequent carbonylation stage.

DETAILED DESCRIPTION OF THE INVENTION

According to the present invention, the above object is achieved by a process which comprises the following steps:

adding aqueous hydrogen peroxide solution or adding aqueous hydrogen peroxide solution and a mineral acid to the reaction solution present after the preparation of the N-acyl-α-amino acid derivative, then separating the aqueous phase containing water-soluble cobalt(II) salt from the nonaqueous product-containing phase, subsequently adding an alkali metal salt of the N-acyl-alpha-amino acid derivative to the aqueous phase from the previous process step, then separating off the precipitated cobalt salt of the N-acyl-alpha-amino acid derivative, and finally converting the resulting cobalt salt of the N-acyl-alpha-amino acid derivative into the cobalt carbonyl catalyst in the presence of a mixture of carbon monoxide and hydrogen.

The conversion of the cobalt salt of the N-acyl-alpha-amino acid derivative into the cobalt carbonyl catalyst is usually carried out at a temperature of from 50 to 250° C. and a pressure of from 20 to 250 bar.

The process of the invention enables, in particular, the cobalt carbonyl catalysts used in amidocarbonylation, in particular $Co_2(CO)_8$ and $HCo(CO)_4$, to be recovered. The starting point for this process is the reaction solution present after the preparation of the N-acyl-α-amino acid derivative, in particular N-acylsarcosine. The process of the invention is particularly suitable for reaction solutions which are obtained in accordance with the process for preparing N-acyl-α-amino acid derivatives described in the European Patent Application No. 95 106 329.6 (EP-A-0 680 948).

In the first process step, aqueous hydrogen peroxide solution is added to this reaction solution, whereby firstly the cobalt carbonyl-N-acyl-alpha-amino acid derivative complexes formed are destroyed and secondly the cobalt present in the cobalt carbonyl compounds is oxidized to cobalt(II) which forms water-soluble salts.

It has been found that the amount of hydrogen peroxide solution to be added is advantageously from 0.1 to 5 equivalents, in particular from 0.2 to 4 equivalents and particularly preferably from 0.5 to 2 equivalents ($H_2O_2$, based on cobalt present in the reaction solution).

If the amidocarbonylation has been carried out in a solution containing mineral acid, e.g. sulfuric acid, the addition of further mineral acid, preferably dilute sulfuric acid, to form water-soluble cobalt salts is generally not necessary.

Suitable mineral acids are, for example, sulfuric acid, phosphoric acid, hydrochloric acid, phosphorous acid and perchloric acid, with particular preference being given to sulfuric acid, in particular dilute sulfuric acid.

The aqueous phase containing water-soluble Co(II) salt, e.g. cobalt(II) sulfate, obtained in the first process step is separated from the nonaqueous phase in which the product is present.

If necessary, the cobalt content of the nonaqueous phase can be further reduced by repeated addition of water or aqueous acid to the nonaqueous phase containing the N-acyl-α-amino acid derivative, if desired in appropriate extraction apparatuses, e.g. mixer-settler boxes, centrifugal extractor or countercurrent extraction column.

It has been found that excess hydrogen peroxide which is present in the aqueous phase after the phase separation can lead, under the precipitation conditions preferred according to the invention, viz. approximately pH>7 to the formation of water-containing cobalt(III) hydroxide which is stable in alkaline medium and is formed as a very fine precipitate which is difficult to filter.

In a preferred embodiment of the process of the invention, the excess hydrogen peroxide is therefore removed before precipitation of the cobalt as cobalt salt of the N-acyl-alpha-amino acid derivative. It is usually removed by heating the aqueous phase, preferably to the boiling point.

If desired, the aqueous phase can be neutralized with alkali metal hydroxide, preferably sodium and/or potassium hydroxide, before heating.

It is industrially advantageous to heat the aqueous phase under reduced pressure and at the same time distil off any solvent still dissolved in the aqueous phase.

According to the invention, cobalt is then obtained from the aqueous phase, from which the excess hydrogen peroxide has been removed if desired, as a water-insoluble precipitate of the cobalt salt of the N-acyl-alpha-amino acid derivative by addition of an alkali metal salt of the corresponding N-acyl-alpha-amino acid derivative, preferably an alkali metal N-acylsarcosinate, particularly preferably sodium and/or potassium N-lauroylsarcosinate.

The alkali metal salt of the N-acyl-amino acid derivative is preferably added in the form of a 30% strength by weight aqueous solution. After addition of the alkali metal salt of the N-acyl-amino acid derivative, the pH of the aqueous phase is preferably about 7.

In order to achieve as complete a precipitation as possible, it is advantageous if the concentration of the water-soluble cobalt salt in the aqueous phase does not exceed 2% by weight.

The resulting water-insoluble precipitate of the cobalt salt of the N-acyl-alpha-amino acid derivative is separated from the aqueous phase by customary means, for example filtration.

The precipitate obtained by the process of the invention generally contains less than 0.2% by weight of salt of the acid used, in the case of sulfuric acid sulfate salt. If necessary, any salt residue still present can be removed by washing the precipitate with water without a significant loss of cobalt ions with the washing water occurring. However, it has been found to be advantageous in the process of the invention for the precipitate of cobalt salt of the N-acyl-alpha-amino acid derivative to be very substantially free of other salts.

The precipitate can be dried before further processing. In general, the air-dried precipitate still contains 3 mol of water per mol of cobalt.

The above-described air-dried precipitate of cobalt salt of the N-acyl-alpha-amino acid derivative can, if desired, be dried further at from 50 to 100° C. and from 10 to 100 torr and the water content can thus be reduced to 1 mol of water per mol of cobalt. However, this drying is generally not necessary for the process of the invention.

The conversion of the resulting cobalt salt of the N-acyl-alpha-amino acid derivative into the cobalt carbonyl catalyst is preferably carried out in a polar, aprotic solvent which can also be used in the subsequent amidocarbonylation as solvent for the cobalt carbonyl catalyst recovered by means of the process of the invention. Particularly suitable solvents have been found to be tetrahydrofuran, glycol dimethyl ether, tert-butyl methyl ether, diglycol dimethyl ether, dimethylformamide, dimethylacetamide, butyl acetate, acetonitrile and N-acylsarcosines. Particular preference is given to using tetrahydrofuran, tert-butyl methyl ether, N-acylsarcosines and glycol dimethyl ether.

For the conversion, the cobalt salt of the N-acyl-alpha-amino acid derivative is reacted with carbon monoxide or a mixture of carbon monoxide and hydrogen, known as synthesis gas, at a temperature of from 50 to 250° C. and a pressure of from 40 to 250 bar, preferably from 60 to 200 bar, particularly preferably from 80 to 180 bar. The composition of the carbon monoxide/hydrogen mixture is preferably from 4:1 to 1:4. The cobalt carbonyl catalyst thus obtained can be used without limitation for the amidocarbonylation.

According to a particular embodiment, the dried or undried cobalt salt of the N-acyl-alpha-amino acid derivative is mixed with further N-acyl-alpha-amino acid derivative before conversion into the cobalt catalyst and processed by heating and stirring to form a melt which is subsequently used as starting material for the conversion into the cobalt catalyst.

Here, the molar ratio of cobalt salt of the N-acyl-alpha-amino acid derivative to N-acyl-alpha-amino acid derivative is usually 1:2–5, preferably 1:2.5–4.

A further advantage of the process of the invention is that any cobalt residues still present in the aqueous phase after the precipitation can be recovered and processed so that complete recycling is ensured.

The remaining aqueous phase usually still contains from 10 to 1000 ppm of cobalt. This remaining cobalt can be separated off, for example, by filtration through an ion exchanger. The ion exchanger can here be used to exhaustion. The cobalt-laden ion exchanger can be regenerated by, for example, washing with sodium sulfate solution so that the ion exchanger is again ready for further cobalt recovery. The solution containing cobalt sulfate and sodium sulfate obtained by washing can be added to the reaction solution used for the first stage of the process of the invention without the process of the invention being adversely affected.

The following examples illustrate the process of the invention.

PREPARATIVE EXAMPLES

The following examples concern the recovery of cobalt carbonyl catalyst used in the preparation of lauroylsarcosine by amidocarbonylation. The starting solution used was the following reaction solution obtained in the amidocarbonylation.

110 l of reaction solution having a density of 0.818 kg/l had the following composition: 60% of N-lauroylsarcosine (product), 39% of solvent (tertbutyl methyl ether), 0.44% of sulfuric acid, 0.13% of cobalt, 0.35% of formaldehyde and about 0.04% of methylamine. 300 ml of 32% strength hydrogen peroxide solution in water were added and the mixture was stirred for 30 minutes at 50° C. After addition of 15 l of water, the phases were separated and 12 l of aqueous phase and 113 l of product phase were obtained. The aqueous phase contained about 1% of tert-butyl methyl ether, 0.98% of cobalt, 2% of formaldehyde, 1% of methyl-ammonium sulfate, about 2.5% of sulfuric acid and an undetermined amount of hydrogen peroxide.

The following examples were each carried out using 1 l of this aqueous solution.

Example 1

1000 ml of the cobalt solution resulting from separation of the organic phase and containing sulfuric acid, residues of hydrogen peroxide and 0.98% by weight of Co are adjusted to a pH of 6.5 by addition of about 130 g of 18% strength by weight sodium hydroxide solution and subsequently freed of hydrogen peroxide by heating to the boiling point. 333 ml of aqueous 1M sodium N-lauroylsarcosinate are subsequently added, forming cobalt N-lauroylsarcosinate in the form of a pale pink precipitate.

The precipitate is filtered off and washed with about 200 ml of water in order to remove any sulfate residues still present.

The cobalt N-lauroylsarcosinate obtained (260 g) is slurried in 260 g of N-lauroylsarcosine (about 3 molar equivalents) and the viscous suspension is heated to 120° C. while stirring. The cobalt-containing melt is freed of the water present under reduced pressure (pressure: 50 mbar). The residue is subsequently dissolved in 500 ml of methyl-t-butyl ether (MTBE) and carbonylated with synthesis gas ($CO:H_2$ ratio=2:1) at 120 bar in a steel autoclave. The reaction is carried out at from 70 to 90° C.

The cobalt carbonyl formed can be used without limitation for the amidocarbonylation.

Example 2

1000 ml of a cobalt solution resulting from separation of the organic phase and containing sulfuric acid, residues of hydrogen peroxide and 0.98% by weight of Co are adjusted to a pH of 6.5 by addition of about 130 g of 18% strength by weight sodium hydroxide solution and subsequently freed of hydrogen peroxide by heating to the boiling point.

333 ml of aqueous 1M sodium N-lauroylsarcosinate are subsequently added, forming cobalt N-lauroylsarcosinate in the form of a pale pink precipitate.

The precipitate is filtered off and washed with about 200 ml of water in order to remove any sulfate residues still present.

The cobalt N-lauroylsarcosinate (260 g) is dried at room temperature (then 220 g), slurried in 500 ml of MTBE (about 2 molar equivalents) and the suspension is carbonylated with synthesis gas ($CO:H_2$ ratio=2:1) at 120 bar in a steel autoclave. The reaction is carried out at from 70 to 90° C. The cobalt carbonyl formed can be used without limitation for the amidocarbonylation.

Example 3

1000 ml of a cobalt solution resulting from separation of the organic phase and containing sulfuric acid, residues of hydrogen peroxide and 0.98% by weight of Co are adjusted to a pH of 6.5 by addition of about 130 g of 18% strength by weight sodium hydroxide solution and subsequently freed of hydrogen peroxide by heating to the boiling point.

333 ml of aqueous 1M sodium N-lauroylsarcosinate are subsequently added, forming cobalt N-lauroylsarcosinate in the form of a pale pink precipitate.

The precipitate is filtered off and washed with about 200 ml of water in order to remove any sulfate residues still present.

The cobalt N-lauroylsarcosinate dried to constant weight at 75–80° C. and 30 torr (205 g) is dissolved in 500 ml of MTBE and carbonylated with synthesis gas ($CO:H_2$ ratio= 2:1) at 120 bar in a steel autoclave. The reaction is carried out at from 70 to 90° C.

The cobalt carbonyl formed can be used without limitation for the amidocarbonylation.

Example 4

The procedure of Example 3 is repeated, except that the dried cobalt N-lauroylsarcosinate obtained (205 g) is dissolved in a mixture of 100 g of N-lauroylsarcosine and 700 ml of MTBE and is carbonylated with synthesis gas (CO:$H_2$ ratio=2:1) at 120 bar in a steel autoclave. The reaction is carried out at from 70 to 90° C.

The cobalt carbonyl formed can be used without limitation for the amidocarbonylation.

What is claimed is:

1. A process for recovering cobalt carbonyl catalysts used in the preparation of N-acyl-alpha-amino acid derivatives by amidocarbonylation comprising the process steps:
    a—amidocarbonylating N-acyl-alpha-amino acid derivatives in a solution forming a reaction solution,
    b—adding aqueous hydrogen peroxide solution to the reaction solution present after the preparation of the N-acyl-alpha-amino acid derivative forming an aqueous phase and non-aqueous product-containing phase,
    c—then separating the aqueous phase containing water-soluble cobalt(II) salt from the non-aqueous product-containing phase,
    d—subsequently adding an alkali metal salt of the N-acyl-alpha-amino acid derivative to the aqueous phase from the step c and forming a precipitated cobalt salt,
    e—then separating off the precipitated cobalt salt of the N-acyl-alpha-amino acid derivative to form a resulting cobalt salt, and
    f—finally converting the resulting cobalt salt of the N-acyl-alpha-amino acid derivative into the cobalt carbonyl catalyst in the presence of a mixture of carbon monoxide and hydrogen.

2. The process as claimed in claim 1, wherein a mineral acid is, in addition to the hydrogen peroxide, added to the reaction solution.

3. The process as claimed in claim 2, wherein the mineral acid is selected from the group consisting of hydrochloric acids, sulfuric acid and phosphoric acid.

4. The process as claimed in claim 2, wherein hydrogen peroxide is used in an amount of from 0.1 to 5 equivalents, based on the cobalt present in the reaction solution.

5. The process as claimed in claim 1, wherein, after the aqueous phase containing the water-soluble colbalt(II) salt is separated off, the hydrogen peroxide present in this phase is removed.

6. The process as claimed in claim 5, wherein the removal of the hydrogen peroxide is carried out by heating the aqueous phase.

7. The process as claimed in claim 5, wherein the aqueous phase is neutralized with alkali metal hydroxide before removal of the hydrogen peroxide.

8. The process as claimed in claim 1, wherein the alkali metal salt of the N-acyl-alpha-amino acid derivative is selected from the group consisting of the corresponding sodium and potassium salts.

9. The process as claimed in claim 1, wherein the alkali metal salt of the N-acyl-alpha-amino acid derivative is the corresponding alkali metal N-acylsarcosinate.

10. The process as claimed in claim 1, wherein the precipitated cobalt salt of the N-acyl-alpha-amino acid derivative is washed and dried after the step d.

11. The process as claimed in claim 1, wherein the cobalt salt of the N-acyl-alpha-amino acid is reacted in the form of a melt with the N-acyl-alpha-amino acid derivative for whose preparation the cobalt carbonyl catalyst is intended.

12. The process as claimed in claim 1, wherein the converting in the presence of the mixture of carbon monoxide and hydrogen is carried out at a temperature of from 50 to 250° C.

13. The process as claimed in claim 12, wherein the converting in the presence of the mixture of carbon monoxide and hydrogen is carried out at a pressure of from 20 to 250 bar.

14. The process as claimed in claim 1, wherein the converting in the presence of the mixture of carbon monoxide and hydrogen is carried out at a pressure of from 20 to 250 bar.

15. The process as claimed in claim 1, wherein the concentration of water-soluble cobalt(II) salt present in the aqueous phase does not exceed 2% by weight.

16. The process as claimed in claim 1, wherein the conversion of the resulting cobalt salt is carried out in a polar, aprotic solvent.

* * * * *